(12) United States Patent
Merrien et al.

(10) Patent No.: US 9,080,624 B2
(45) Date of Patent: Jul. 14, 2015

(54) DISK BRAKE WITH STABILIZED BRAKE PADS, AND RELATED METHODS FOR ASSEMBLING AND REPLACING A PAD

(71) Applicant: CHASSIS BRAKES INTERNATIONAL B.V., Amsterdam (NL)

(72) Inventors: Sandra Merrien, Paris (FR); Andre Gaye, Dalian (CN)

(73) Assignee: CHASSIS BRAKES INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 14/264,841

(22) Filed: Apr. 29, 2014

(65) Prior Publication Data

US 2014/0318905 A1 Oct. 30, 2014

(30) Foreign Application Priority Data

Apr. 29, 2013 (FR) .................................. 13 53906

(51) Int. Cl.
*F16D 65/40* (2006.01)
*F16D 55/228* (2006.01)
*F16D 55/2265* (2006.01)
*F16D 65/097* (2006.01)
*F16D 121/02* (2012.01)

(52) U.S. Cl.
CPC .......... *F16D 55/228* (2013.01); *F16D 55/2265* (2013.01); *F16D 65/0972* (2013.01); *F16D 2121/02* (2013.01)

(58) Field of Classification Search
CPC F16D 65/097; F16D 65/0972; F16D 65/0974

USPC ................................ 188/73.31, 73.37, 73.38
See application file for complete search history.

(56) References Cited

U.S. PATENT DOCUMENTS

| 2009/0159376 | A1 | 6/2009 | Rossignol et al. | |
| 2012/0222925 | A1* | 9/2012 | Kaneko | 188/73.38 |
| 2014/0326548 | A1* | 11/2014 | Merrien et al. | 188/73.38 |

FOREIGN PATENT DOCUMENTS

| DE | 199 56 968 A1 | 5/2000 |
| WO | 2013/087856 A1 | 6/2013 |
| WO | 2013/087868 A1 | 6/2013 |

OTHER PUBLICATIONS

French Search Report, dated Apr. 9, 2014, from corresponding FR application.

* cited by examiner

*Primary Examiner* — Vishal Sahni
(74) *Attorney, Agent, or Firm* — Young & Thompson

(57) ABSTRACT

A disk brake has a fork with two opposing arms each having a C-shaped axial seat designed to receive a brake pad with two opposing lateral lugs, each lug receiving a pad spring having at least one lower sliding branch, in which a laminar element is interposed between the lug and C-shaped seat, the element having a first lower sliding flange receiving the sliding branch of the pad spring and a second upper vertical supporting flange in the seat. The laminar element is elastically deformable between an initial free state in which the sliding flange and the lower face of the seat form a first acute angle and at least one state of loading by the pad spring in which the sliding flange forms a second acute or zero angle that is less than the first acute angle, and in which the sliding branch of the pad spring is pre-stressed.

19 Claims, 4 Drawing Sheets

DISK BRAKE WITH STABILIZED BRAKE PADS, AND RELATED METHODS FOR ASSEMBLING AND REPLACING A PAD

TECHNICAL FIELD OF THE INVENTION

The invention relates to a motor-vehicle disk brake.

TECHNICAL BACKGROUND TO THE INVENTION

The invention relates to a motor-vehicle disk brake including:
- a fork with at least two generally vertically oriented opposing arms, each having:
  - an axial seat having a C-shaped section opening horizontally towards the opposite arm and delimited by an upper face and a lower face oriented generally horizontally;
  - a generally vertically oriented axial weight-bearing surface arranged beneath the seat;
- at least one brake pad including:
  - two opposing lateral assembly lugs, each of which is received in a related seat of a related arm of the fork and is delimited by an upper surface oriented generally horizontally;
  - a lower vertically oriented surface related to each lug and located beneath the related lateral lug;
- for each lug of the brake pad, a pad spring that is attached to the related lug of the brake pad and that includes at least one lower sliding branch that cooperates with the lower face of said related seat and that loads said upper surface of the lug bearing vertically upwards against the upper face of said related seat;
- for each arm of the fork, a laminar element made of spring steel that has at least:
  - an upper axial sliding part having a C-shaped section that is received and locked in the related seat, that has a first lower flange, referred to as the sliding flange that is generally substantially horizontally oriented and that is interposed between the sliding branch of the pad spring and said lower face of the seat of the fork, and a second upper flange, referred to as the vertical support flange, that is oriented generally horizontally and that is interposed between said upper surface of the related lug of the brake pad and the upper face of said related seat;
  - at least one lower axial supporting part having a third flange, referred to as the transverse supporting flange, that prolongs the sliding flange, which extends in a plane orthogonal to the plane of the sliding flange, which is arranged in contact with said transverse weight-bearing surface of the arm, and that is able to form a transverse stop for said related lower surface of the brake pad.

A conventional disk brake includes a fork having at least two generally vertically oriented opposing arms that each have a lateral seat that extends axially and has a C-shaped section opening horizontally towards the opposite arm, and that includes a generally horizontally oriented upper face and a generally vertically oriented lower face.

The seat receives a laminar element made of spring steel that has at least one generally substantially horizontally oriented upper sliding flange that is interposed between the lug of the brake pad and the upper face of the seat, a generally vertically oriented vertical supporting flange that is interposed between the lug of the brake pad and the vertical face, and an elastic retaining flange that is arranged beneath the lug of the brake pad.

In such brakes, increasing the stiffness of the elastic retaining flange to improve retention of the brake pad creates transverse and vertical loads that, on account of the proximity of the elastic flange and of the vertical supporting flange, tend to deform the laminar element.

This prevents a flat-on-flat contact of the laminar element if the lug is not exerting significant pressure on the laminar element, in particular in relation to the vertical supporting flange thereof.

These loads are difficult to control on account of the design of the laminar element. Thus, for low pressures exerted by the lug of the brake pad, the brake pad is in an unpredictable position in relation to the lateral guide seats of the brake pad.

Moreover, during braking, the brake pad follows the rotation of the disk and is subject to a rotational torque exerted substantially on the theoretical center of contact between the brake pad and the disk, while being in transverse horizontal contact.

Theoretically, the resulting forces are aligned but, in consideration of manufacturing variations and uncertainty regarding the actual position of the transverse support between the lug and the laminar element caused by deformation of the element (as explained above), the resulting torque applied to the brake pad (about said theoretical center) may be positive or negative, causing the brake pad to rotate in the direction of rotation of the disk or, conversely, in the opposite direction, which results in unstable behavior of the brake pad.

To overcome this drawback, it is proposed to disconnect the vertical supporting face of the laminar element from the sliding face and from the horizontal supporting face according to a brake design described in the preamble.

Such disk brakes are known in the prior art.

Thus, in such a disk brake, the laminar element has a first lower sliding flange that is theoretically parallel to the second upper vertical supporting flange. Furthermore, the third transverse supporting flange, outside the seat, is orthogonal to the first lower sliding flange.

The first lower sliding flange has an anchoring or attachment tab or tongue that protrudes downwards and that cooperates with the lower face of the seat to anchor itself in this lower face of said seat.

The laminar element positions the lug of the brake pad such as to enable the pad spring to be load-bearing. Preferably, the lower flange provides the corresponding pre-stressing.

SUMMARY OF THE INVENTION

The invention overcomes this drawback by proposing a new design of a laminar element able to preload the pad spring when the lug fitted with the spring thereof is inserted and arranged in the laminar element, such as to guarantee optimum contacts between the vertical supporting element of the laminar element and the pad.

Furthermore, the vertical and/or radial instability of the brake pad are advantageously stabilized by disconnecting the axial sliding zones of the brake pads, and by disconnecting the vertical and/or radial return and guide forces.

For this purpose, the invention proposes a disk brake of the type described above, characterized in that the laminar element is elastically deformable between:
- an initial state, prior to assembly in the seat of the lug of the brake pad fitted with the brake pad spring thereof, in which the sliding flange and the plane of the lower face of the seat form a first acute angle, at least one loaded state, subsequent to assembly in the seat of the lug of the brake pad fitted with the brake spring thereof, in which the sliding flange and the plane of the lower face of the seat form a second acute or zero angle, the value of which is less than the value of the first acute angle, and in which said sliding branch of the pad spring is elastically pre-stressed.

According to other features of the invention:

the sliding flange of the upper sliding part has an anchoring tongue that protrudes downwards and that cooperates with the lower face of the seat to anchor itself in this lower face and lock said upper part in the assembled position in the related seat;

the laminar element includes an axial immobilization part that prolongs the second vertical supporting flange upwards, and that cooperates with a matching part of the arm to axially immobilize the laminar element in relation to the arm, a connection edge of the sliding flange with the transverse supporting flange has at least one axial cutout, the axial cutout extends symmetrically along the connection edge, following most of this connection edge, a transverse mid-plane passing through the lugs of the pad passes through a midpoint of application of the braking forces of said brake pad on a related disk of the disk brake, the lower horizontal face of the seat of the fork and the first lower sliding flange of the laminar element are arranged beneath a midpoint of application of the braking forces of the brake pad on the disk, each pad spring has at least one curved branch that extends in the axial direction and that connects the sliding branch thereof to an attachment branch of the brake pad to the lug of the brake pad, for a total compression of said third flange, and for a hydraulic actuating pressure of the brake equal to $2 \cdot 10^5$ Pa, a return force of the brake pad is less than or equal to a tangential drive force of the brake pad by the rotation of the brake disk with which it is cooperating, the brake has a hydraulic actuating piston with a diameter of substantially 36 mm and, for a total compression of the third flange, the return force is substantially 30 N.

The invention also relates to a method for assembling a disk brake of the type described above, characterized in that it includes:

a first step in which the laminar elements are locked into the seats of the arms of the fork, a second step in which the pad springs are attached to the brake pad, the curved branches being arranged on the same side of the brake pad.

a third step in which the brake pad fitted with the two pad springs thereof is inserted into the seats of the arms of the fork by first inserting the curved branches of the pad springs so that said branches of said pad springs load the laminar elements by separating the first lower sliding flanges from the second vertical supporting flanges.

The invention also relates to a method for replacing a brake pad of a disk brake of the type described above, characterized in that it includes:

a first step in which the curved branches of the pad springs are compressed, a second step in which the brake pad fitted with the brake springs thereof is removed from the seats of the arms of the fork, a third step in which a new brake pad, the lugs of which are fitted with two brake springs, is inserted into the seats of the arms of the fork by first inserting the curved branches of the pad springs so that said branches of said pad springs load the laminar elements by separating the first lower sliding flanges from the second vertical supporting flanges.

SUMMARY OF FIGURES

Other features and advantages of the invention are given in the detailed description below, provided with reference to the attached drawings, in which.

DETAILED DESCRIPTION OF THE FIGURES

In the description and claims below, expressions such as "axial", "transverse" and "vertical" orientations are used as non-limiting references to the dihedral (L, T, V) shown in the figures and in the definitions given in the description, without reference to terrestrial gravity.

In the description below, identical reference signs refer to identical parts or parts having similar functions.

Figure 1:
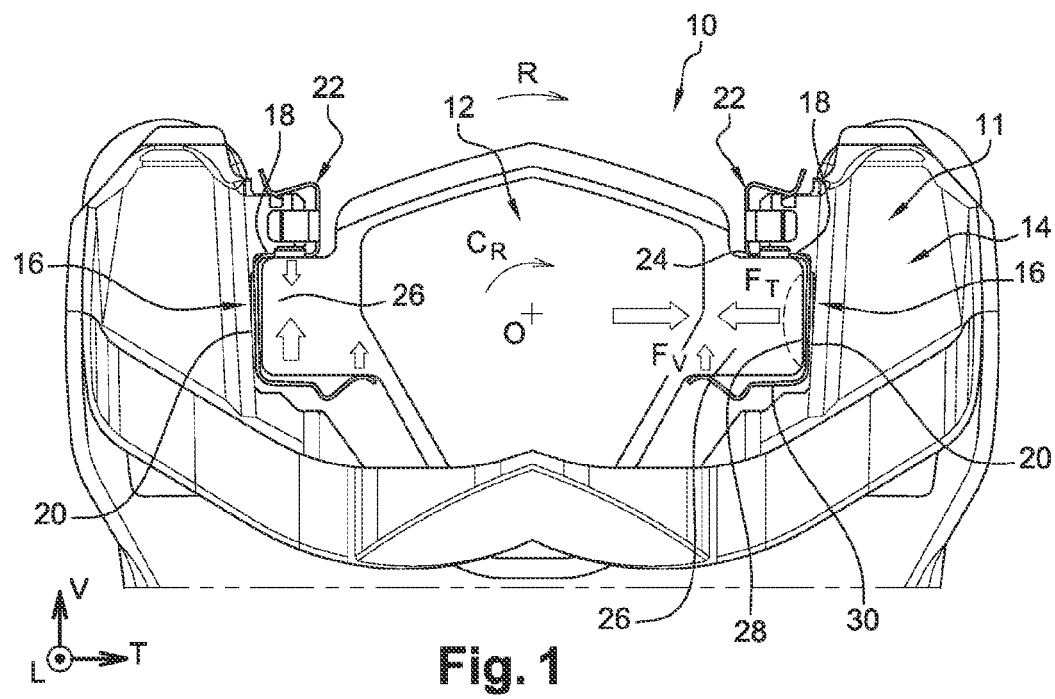
FIG. 1 is an axial view of an assembly of a brake pad in a fork of a disk brake according to the prior art.

FIG. 1 shows an assembly of a brake pad 12 in a fork 11 of a disk brake 10 according to the prior art. The brake pad 12 has two opposing lugs 26.

In a known manner, the brake has a fork 11 with at least two opposing arms 14 oriented generally vertically "V", each of which has a seat 16 oriented axially in the direction "L", having a C-shaped section opening horizontally towards the opposing arm 14.

Each seat 16 has an upper face 18 oriented generally horizontally and a parallel lower face 20 oriented generally vertically.

The seat 16 receives and seats a laminar element 22 made of spring steel that has at least one generally horizontally oriented upper sliding and supporting flange 25 that is interposed between the lug 26 of the brake pad 12 and the upper face 18 of the seat 16, a vertically oriented vertical supporting flange 28 that is interposed between the lug 26 of the brake pad and the vertical face 20, and an elastic retaining flange 30 that is arranged beneath the lug 26 of the brake pad 12.

Figure 2:
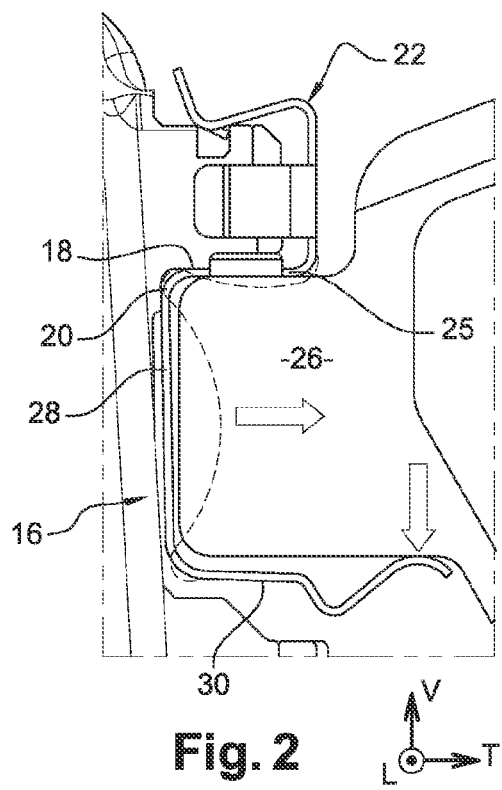
FIG. 2 is a detail view of the assembly of a lug of a brake pad in a seat of a fork according to the prior art shown in FIG. 1.

In such brakes, if the stiffness of the elastic retaining flange 30 is increased to improve retention of the brake pad 12, the elastic foot 30 induces transverse loads "$F_T$" (globally in a horizontal direction) and vertical loads "$F_V$" that tend, on account of the proximity of the elastic flange 30 and the vertical supporting flange 28, to deform the laminar element, which prevents a flat-on-flat contact of the laminar element, as shown by the dotted lines in FIG. 2, if the lug 26 is not exerting sufficient pressure on said laminar element 22, in particular in relation to the vertical supporting face thereof.

Moreover, during braking, the brake pad 12 follows the rotation "R" of the disk and is subject to a rotational torque "$C_R$" exerted substantially on the theoretical center "O" of contact between the friction lining of the brake pad and a related annular track of the disk, while being in transverse horizontal contact.

The resulting forces (not shown) exerted on the lugs 26 of the brake pad 12 are aligned. In consideration of manufacturing variations and uncertainty regarding the actual position of the transverse support between the lug 26 and the laminar element 22 resulting from deformation of the element 22, the resulting torque applied to the brake pad 12 may be positive or negative, causing the brake pad 12 to rotate in the direction "R" of rotation of the disk or in the opposite direction.

To overcome this drawback, it is proposed to disconnect the vertical supporting flange 28 of the laminar element 22 from the horizontal supporting and sliding flange.

Figure 3:
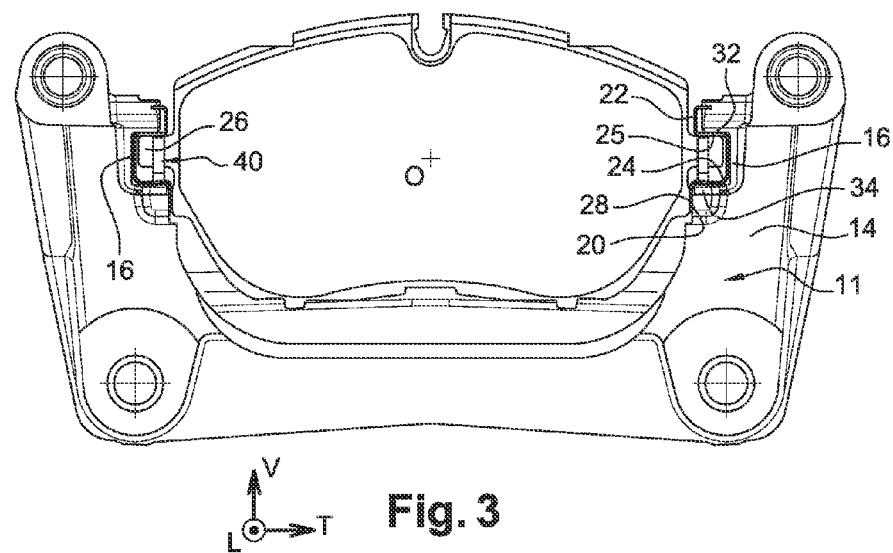
FIG. 3 is an axial view of a brake pad assembly in a fork of a disk brake according to the invention.
Figure 4:
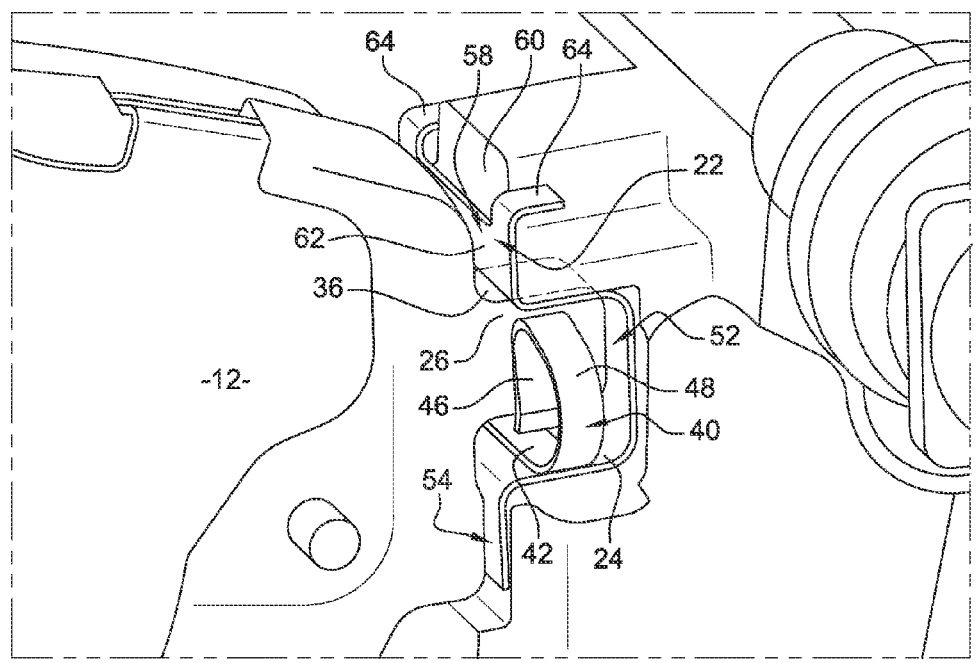
FIG. 4 is a perspective detailed view of the assembly in FIG. 3.
Figure 4:

According to this design, as shown in FIGS. 3 and 4, each arm 14 has an axial seat 16 with a C-shaped section opening horizontally towards the opposite arm and that is delimited by an upper face 32 and by a lower face 34 oriented generally horizontally, and it includes an axial weight-bearing surface 20 oriented generally vertically and arranged beneath the seat 16.

According to this design, the brake 10 has at least one brake pad 12 with two opposing lateral assembly lugs 26, each of which is received in a related seat 16 of a related arm 14 of the fork 11.

Figure 9:
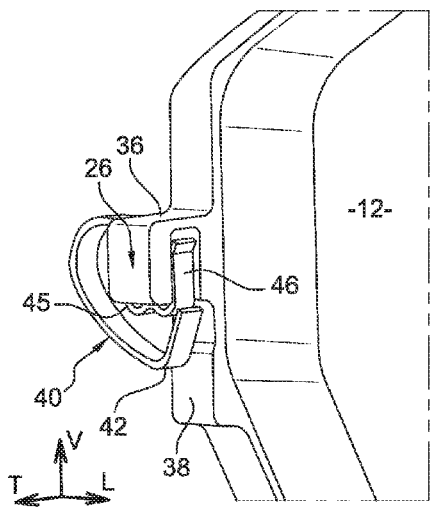
FIG. 9 is a perspective view showing the assembly of a pad spring on a lug of the brake pad.
Figure 10:
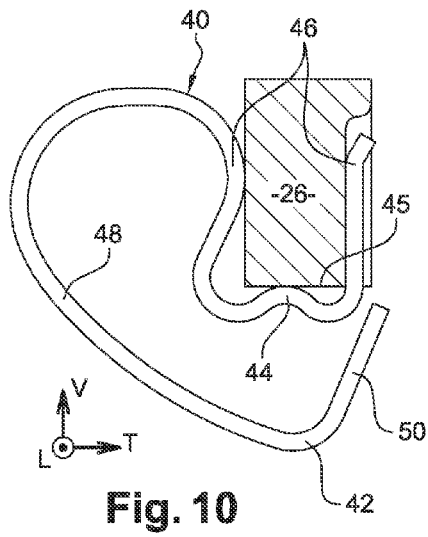
FIG. 10 is an axial cross section of the assembly of a pad spring on a lug of the brake pad.
Figure 6:
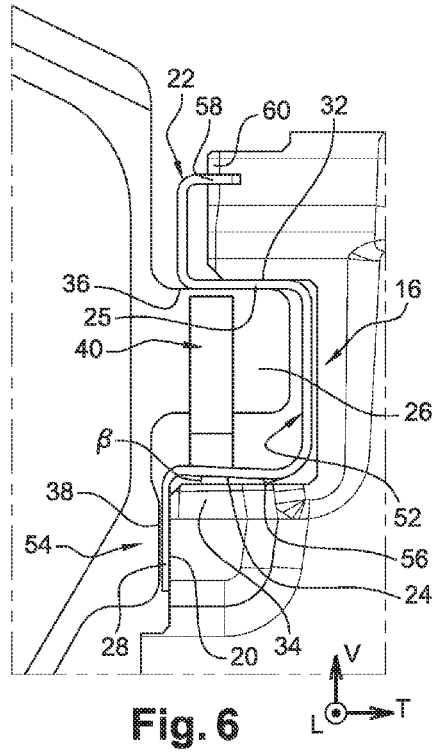
FIG. 6 is a detailed side view of the laminar element shown in the seat in the loaded state thereof.

As shown in FIGS. 6, 9 and 10, each lug 26 of each brake pad 12 is delimited by a generally horizontally oriented upper surface 36. Furthermore, for each brake pad 12, a vertically oriented lower surface 38 is located beneath the related lateral lug 26.

Furthermore, the brake 10 includes a pad spring 40 that is attached to the related lug 26 of the brake pad 12.

The pad spring 40 includes, in a known manner, at least one lower sliding branch 42 that cooperates with the lower face 34 of the related seat and that pushes the upper surface 36 of the lug vertically upwards against the upper face 32 of the seat 16.

As shown in FIG. 10, in a known manner, such a pad spring 40 is commonly referred to as a "spiral spring" and it may also include, without limiting the invention, an upper branch 44 bearing upwards against a lower horizontal surface 45 of the lug 26 of the brake pad 12. This upper branch 44 is part of an attachment branch, or clip, 46 that elastically clamps the lug 26 of the brake pad to attach the pad spring 40 to the lug 26.

The pad spring 40 also has a curved branch 48 that links the attachment branch 46 to the lower sliding branch 42. This curved branch 48 primarily guarantees the elasticity of the pad spring 40.

Finally, the pad spring 40 includes a free branch 50 that prolongs the lower sliding branch 42 and that closes the profile such as to prevent entanglement of the springs stored for assembly.

The lug 26 is received in the seat 16, interposing a spring steel laminar element 22 related to each arm 14 of the fork 11.

As shown more specifically in FIGS. 5 to 8, such a laminar element 22 includes an axially oriented upper part 52, referred to as the sliding part, having a C-shaped section that is received and locked in the related seat 16, which includes a first lower sliding flange 24 oriented generally substantially horizontally, which is interposed between the sliding branch 42 of the pad spring 40 and the lower face 34 of the seat 16 of the fork 11.

The upper part 52 includes a second upper vertical supporting flange 25 oriented generally horizontally that is interposed between the upper surface 36 of the related lug 26 of the brake pad 12 and the upper face 32 of the related seat 16.

The laminar element 22 also has at least one lower axially oriented supporting part 54 having a third transverse supporting flange 28 that prolongs the sliding flange 24, which extends in a plane orthogonal to the plane of the sliding flange 24, which is arranged in contact with the transverse weight-bearing surface 20 of the arm 14, and that is able to form a transverse stop for the related lower surface 38 of the brake pad 12.

In such a disk brake, the laminar element 22 therefore has a first lower sliding flange 24 that is theoretically parallel to the second upper vertical supporting flange 25.

Furthermore, the third transverse supporting flange 28, outside the seat 16, is substantially orthogonal to the first lower sliding flange 24.

Figure 5:
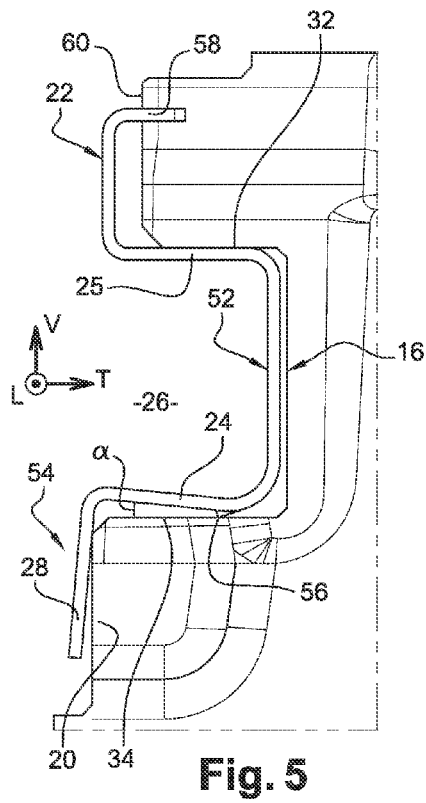
FIG. 5 is a detailed side view of the laminar element shown in the seat in the initial state thereof.

The first lower sliding flange 24 also has an anchoring tongue 56 that is generally cut out of the first lower flange 24, which protrudes downwards, and which cooperates with the lower face 34 of the seat 16 to anchor itself in this lower face 34 of the seat 16, as shown in FIGS. 5 and 6, thereby guaranteeing a flat-on-flat facing contact between the flange 25 and the related surface.

Furthermore, the anchoring tongue 56 is cut out such as to be separate from the sliding flange, which makes it possible to select the values of the angles "α" and "β" without compromising the correct positioning of the laminar element in the seat thereof.

The instability of the brake pad and the risk of related noise and/or vibrations are aggravated by increasing rigidity, and subsequently the intensity of the return force exerted by the third flange 28 while, on the other hand, the brake pad is stabilized by "medium" or "strong" braking forces on account of the brake pad being driven by the rotation of the disk.

Advantageously, for a total (bearing) return compression by the third flange 28, the return force $F_S$ is less than or equal to the tangential driving force $F_{tg}$ of a brake pad for an actuating pressure of the brake of $10^5$ Pascals (Pa).

$F_{tg}$ is equal to the product of μ×P×S in which μ is equal to the friction coefficient of the friction lining of the brake pad on the disk, P is equal to the hydraulic actuating pressure of the brake, and S is equal to the surface area of the hydraulic actuating piston of the brake. If P is $2 \cdot 10^5$ Pa, $F_{tg}$ is μ×$2 \cdot 10^5$×S.

For a hydraulic actuating piston with a diameter of 60 mm, where μ is 0.5, $F_S$ is advantageously less than or equal to 280 Newtons (N).

For a piston with a diameter of 36 mm, $F_S$ is advantageously less than or equal to 95 N, and preferably less than or equal to 40 N, and even more preferably less than or equal to 30 N. For a 36 mm piston, $F_S$ is for example 20N, 25 N, 30 N or 40 N.

Advantageously, this limited stiffness is due to the geometry of the laminar element, in particular the angle "β", and a cutout 68 as described below.

The invention proposes a design of the laminar element 22 that is able to preload the pad spring 40 once it has been inserted in the laminar element 22, thereby enabling limited stiffness on the third flange 28.

The laminar element 22 is elastically deformable between an initial state as shown in FIG. 5, prior to assembly in the seat 16 of the lug 26 of the brake pad 12 fitted with the pad spring 14 thereof, in which the first sliding flange 24 and the plane of the lower face 34 of the seat form a first acute angle "α", and a loaded state as shown in FIG. 6 resulting from assembly in the seat 16 of the lug 26 of the brake pad 12 fitted with the pad spring 40 thereof, the first sliding flange 24 and the plane of the lower face of the seat 34 forming, in this loaded state, a second acute or zero angle "β", the value of which is less than the value of the first acute angle "α", and in which the sliding branch 42 of the pad spring is elastically pre-stressed.

In this layout, in the initial state thereof, the upper sliding axial part 52 with a C-shaped section is substantially "closed", the first sliding flange 24 also forming an acute angle with all planes parallel to the second upper vertical supporting flange 25.

Equally, the third transverse supporting flange 28 forms an acute angle "α" with the transverse weight-bearing surface 20 of the arm 14.

When the pad spring 40 is inserted into the laminar element 22, the first sliding flange 24 forms a reduced acute angle "β" with all planes parallel to the second upper vertical supporting flange 25. Equally, the third transverse supporting flange 28 forms an acute angle "β" with the transverse weight-bearing surface 20 of the arm 14.

The pad spring 40 is then preloaded by the first sliding flange 24, which guarantees a minimum loading and/or pre-stressing of the pad spring when the brake pad 12 is subject to a rotational torque resulting from friction of the brake pad on the brake disk.

Finally, in instances of extreme loading of the pad spring 40 by the brake pad 12, and in particular if the brake pad tends to move transversely/horizontally in the direction "T", the force exerted tends to force the third transverse supporting flange 28 to bear flatly against the transverse weight-bearing surface 20 of the arm 14, thus guaranteeing a flat-on-flat contact able to better absorb the forces, at low braking pressure, on account of the angles mentioned above, and by a cutout 68 described below.

In the preferred embodiment of the invention, as shown in FIG. 3, a transverse mid-plane passing substantially through the lugs 26 of the brake pad 12 passes substantially through a midpoint "O" of application of the braking forces of the brake pad 12 on the brake disk.

Furthermore, the vertical face 20 and the flange 28 of the laminar element are arranged beneath the midpoint "O" of application of the braking forces of the brake pad on the disk.

This arrangement makes it possible to substantially determine the position the application of point of the reaction forces of the arms 14 on the brake pad 12, and therefore to determine the reaction torque that is exerted about the midpoint "O" of application of the braking forces of the brake pad 12 on the disk.

Thus, the total torque applied to the brake pad 12 resulting from the torque exerted by the disk on the brake pad 12 and the reaction torque exerted by the arms 14 on the brake pad 12 is always oriented in the same direction, which guarantees the stability of the brake pad 12 during braking.

Figures 7, 8:
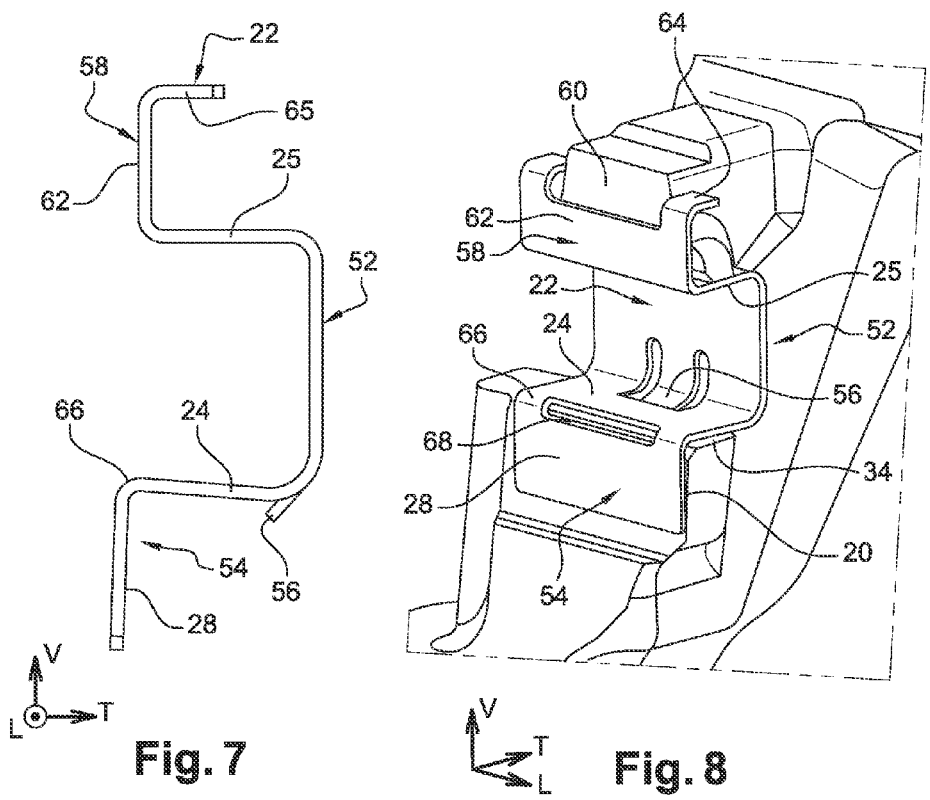
FIG. 7 is a detailed side view of the laminar element shown in the initial state thereof.
FIG. 8 is a detailed perspective view of the laminar element shown in the seat in the initial state thereof.

As shown in FIG. 8, to guarantee optimum positioning of the third transverse supporting flange against the transverse weight-bearing surface 20 of the arm 14, a edge 66 for connecting the sliding flange 24 to the transverse supporting flange 28 includes at least one axial cutout 68.

This cutout enables the angular stiffness of the edge 66 to be reduced, thereby facilitating the deployment or "opening" of the transverse supporting flange.

In this case, the axial cutout 68 extends symmetrically along the connection edge 66, covering most of the width, in the axial direction, of the connection edge 66.

As for the pad spring 40 described above, the first lower sliding flange 24 has an anchoring or attachment tab or tongue 56, in this case cut out from the first lower flange 24, that protrudes vertically downwards and that cooperates with the lower face 34 of the seat 16 to anchor itself in this lower face 34 of said seat 16.

The laminar element 22 also includes an axial immobilization part 58 that prolongs the second vertical supporting flange 25 upwards, and that cooperates with a matching part 60 of the arm 14 to axially immobilize the laminar element 22 in relation to the arm 14.

As shown in FIGS. 4 and 8, the complementary part 60 of the arm is stud-shaped and has an axial length less than that of the seat 16 and the immobilization part 58 of the laminar element 22 essentially comprises a fourth vertical flange 62 from which extend two legs 64 that clamp the stud-shaped part 60 that forms an axial stop with which the two opposing legs 64 cooperate.

A method for assembling a disk brake is related to the disk brake according to the invention.

This assembly method includes a first step in which the laminar elements 22 are positioned and locked in the related seats 16 of the arms 14 of the fork 11.

The method includes a second subsequent step in which the pad springs 40 are attached to the brake pad 12, the curved branches 48 being arranged on the same side of the brake pad 12.

The method then includes a third step in which the brake pad 12, previously fitted with the two pad springs 40 thereof, is inserted into the seats 16 of the arms 14 of the fork 11 by first inserting the curved branches 48 of the pad springs 40 so that these branches 48 of said pad springs 40 load the laminar elements 22 by separating the first lower sliding flanges 24 from the second vertical supporting flanges 25, thereby pre-stressing the pad springs 40.

Similarly, a method for replacing a brake pad 12 is related to the disk brake according to the invention.

Finally, during the final step, a new brake pad 12 with lugs 26 fitted with two pad springs 40 is inserted into the related seats 16 of the arms 14 of the caliper by inserting first the curved branches 48 of the pad springs 40 so that these branches 48 of the pad springs 40 load the laminar elements 22 by "vertically" separating the first lower sliding flanges 24 from the second vertical supporting flanges 25, thereby pre-stressing the pad springs 40.

The invention proposes a disk brake that suffers no untimely movement of the brake pads 12, which helps to stabilize said brake pads 12, increases the life of the friction linings of said brake pads 12 and reduces braking noise.

The invention claimed is:

1. A motor-vehicle disk brake including:
   a fork (11) with at least two generally vertically oriented (V) opposing arms (14), each having:
   an axial seat (16) having a C-shaped section opening horizontally towards the opposite arm (14) and delimited by an upper face (32) and a lower face (34) oriented generally horizontally;
   a generally vertically oriented (V) axial weight-bearing surface (20) arranged beneath the seat (16);
   at least one brake pad (12) including:
   two opposing lateral assembly lugs (26), each of which is received by a related seat (16) of a related arm (14) of the fork (11) and is delimited by an upper surface (36) of the lug (26) oriented generally horizontally (L);
   a lower vertically oriented surface (38) related to each lug (26) and located beneath the related lateral lug;
   for each lug (26) of the brake pad (12), a pad spring (40) that is attached to the related lug (26) of the brake pad (12) and that includes at least one lower sliding branch

(42) that cooperates with the lower face (34) of the related seat (16) and that presses said upper surface (36) of the lug (26) vertically upwards against the upper face (32) of the related seat (16);

for each arm (14) of the fork (11), a laminar element (22) made of spring steel that has at least:

an upper axial sliding part (52) having a C-shaped section that is received and locked in the related seat (16), that has a first lower flange (24), referred to as the sliding flange that is generally substantially horizontally oriented and that is interposed between the sliding branch (42) of the pad spring (40) and the lower face (34) of the seat (16) of the fork (11), and a second upper flange (25), referred to as the vertical support flange, that is generally horizontally oriented and that is interposed between the upper surface (36) of the related lug (26) of the brake pad (12) and the upper face (32) of the related seat (16);

at least one lower axial supporting part (54) having a third flange (28), referred to as the transverse supporting flange, that prolongs the sliding flange (24), which extends in a plane orthogonal to the plane of the sliding flange (24), which is arranged in contact with the transverse weight-bearing surface (20) of the related arm (14), and that is able to form a transverse stop for the related lower surface (38) of the brake pad (12), characterized in that the laminar element (22) is elastically deformable between:

an initial state, prior to assembly in the seat (16) of the lug (26) of the brake pad (12) fitted with the pad spring (40) thereof, in which the sliding flange (24) and the plane of the lower face (34) of the seat (16) form a first acute angle ($\alpha$), at least one loaded state, subsequent to assembly in the seat (16) of the lug (26) of the brake pad (12) fitted with the brake spring (40) thereof, in which the sliding flange (24) and the plane of the lower face (34) of the seat (16) form a second acute angle ($\beta$) or zero angle, the value of which is less than the value of the first acute angle ($\alpha$), and in which said sliding branch (42) of the pad spring (40) is elastically pre-stressed.

2. The disk brake as claimed in claim 1, characterized in that the sliding flange (24) of the upper sliding part has an anchoring tongue (56) that protrudes downwards and that cooperates with the lower face (34) of the seat (16) to anchor itself in this lower face (34) and lock the upper part (52) in the assembled position in the related seat (16).

3. The disk brake as claimed in claim 2, characterized in that the laminar element (22) includes an axial immobilization part (58) that prolongs the second vertical supporting flange (25) upwards, and that cooperates with a matching part (60) of the arm (14) to axially immobilize the laminar element (22) in relation to the arm (14).

4. The disk brake as claimed in claim 3, characterized in that a connection edge (66) of the sliding flange (24) with the transverse supporting flange (28) has at least one axial cutout (68).

5. The disk brake as claimed in claim 4, characterized in that the axial cutout (68) extends symmetrically along the connection edge (66), covering most of this connection edge (66).

6. The disk brake as claimed in claim 5, characterized in that a transverse mid-plane passing through the lugs (26) of the brake pad (12) passes through a midpoint (O) of application of the braking forces of said brake pad (12) on a related disk of the disk brake.

7. The disk brake as claimed in claim 6, characterized in that the lower horizontal face (34) of the seat (26) of the fork (11) and the first lower sliding flange (24) of the laminar element (22) are arranged beneath a midpoint (O) of application of the braking forces of the brake pad (12) on the disk.

8. The disk brake as claimed in claim 7, characterized in that each pad spring (40) has at least one curved branch (48) that extends in the axial direction and that connects the sliding branch (42) thereof to an attachment branch (46) of the brake pad to the lug (26) of the brake pad.

9. The disk brake as claimed in claim 1, characterized in that, for a total compression of said third flange (28), and for a hydraulic actuating pressure of the brake equal to $2 \cdot 10^5$ Pa, a return force $F_S$ of the brake pad (12) is less than or equal to a tangential drive force $F_{tg}$ of the brake pad by the rotation of the brake disk with which it is cooperating.

10. The disk brake as claimed in claim 9, characterized in that it has a hydraulic actuating piston with a diameter of substantially 36 mm and in that, for a total compression of the third flange (28), the return force $F_S$ is substantially 30 N.

11. A method for assembling a disk brake as claimed in claim 8, characterized in that it includes:

a first step in which the laminar elements (22) are locked into the related seats (16) of the arms (14) of the fork (11), a second step in which the pad springs (40) are attached to the brake pad (12), the curved branches (48) being arranged on the same side of the brake pad (12), a third step in which the brake pad (12) fitted with the two pad springs (40) thereof is inserted into the seats (16) of the arms (14) of the fork (11) by first inserting the curved branches (48) of the pad springs (40) so that said branches of said pad springs (40) load the related laminar elements (22) by separating the first lower sliding flanges (24) from the second vertical supporting flanges (25).

12. A method for replacing a brake pad of a disk brake as claimed in claim 8, characterized in that it includes:

a first step in which the curved branches (48) of the pad springs (40) are compressed, a second step in which the brake pad (12) fitted with the brake springs (40) thereof is removed from the seats (16) of the arms (14) of the fork (11), a third step in which a new brake pad (12), the lugs (26) of which are fitted with two pad springs (40), is inserted into the seats (16) of the arms (14) of the caliper by first inserting the curved branches (48) of the pad springs (14) so that said branches (48) of said pad springs (40) load the laminar elements (22) by separating the first lower sliding flanges (24) from the second vertical supporting flanges (25).

13. The disk brake as claimed in claim 1, characterized in that the laminar element (22) includes an axial immobilization part (58) that prolongs the second vertical supporting flange (25) upwards, and that cooperates with a matching part (60) of the arm (14) to axially immobilize the laminar element (22) in relation to the arm (14).

14. The disk brake as claimed in claim 1, characterized in that a connection edge (66) of the sliding flange (24) with the transverse supporting flange (28) has at least one axial cutout (68).

15. The disk brake as claimed in claim 1, characterized in that a transverse mid-plane passing through the lugs (26) of the brake pad (12) passes through a midpoint (O) of application of the braking forces of said brake pad (12) on a related disk of the disk brake.

16. The disk brake as claimed in claim 1, characterized in that the lower horizontal face (34) of the seat (26) of the fork (11) and the first lower sliding flange (24) of the laminar element (22) are arranged beneath a midpoint (O) of application of the braking forces of the brake pad (12) on the disk.

17. The disk brake as claimed in claim 1, characterized in that each pad spring (40) has at least one curved branch (48) that extends in the axial direction and that connects the sliding branch (42) thereof to an attachment branch (46) of the brake pad to the lug (26) of the brake pad.

18. The disk brake as claimed in claim 1, characterized in that, for a total compression of said third flange (28), and for a hydraulic actuating pressure of the brake equal to $2 \cdot 10^5$ Pa, a return force $F_S$ of the brake pad (12) is less than or equal to a tangential drive force $F_{tg}$ of the brake pad by the rotation of the brake disk with which it is cooperating.

19. The disk brake as claimed in claim 2, characterized in that the laminar element (22) includes an axial immobilization part (58) that prolongs the second vertical supporting flange (25) upwards, and that cooperates with a matching part (60) of the arm (14) to axially immobilize the laminar element (22) in relation to the arm (14).

* * * * *